(12) United States Patent
Kim

(10) Patent No.: US 8,730,692 B2
(45) Date of Patent: May 20, 2014

(54) SWITCHING MODE POWER SUPPLY AND METHOD OF CONTROLLING THE SAME

(75) Inventor: Kwang-wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 13/182,550

(22) Filed: Jul. 14, 2011

(65) Prior Publication Data

US 2012/0033467 A1 Feb. 9, 2012

(30) Foreign Application Priority Data

Aug. 9, 2010 (KR) .......................... 10-2010-0076634

(51) Int. Cl.
*H02H 7/122* (2006.01)
(52) U.S. Cl.
USPC ....................................... 363/56.12
(58) Field of Classification Search
USPC ............... 363/50, 56.12, 56.05, 56.08, 56.11; 361/18; 323/282, 351
See application file for complete search history.

(56) References Cited

U.S. PATENT DOCUMENTS

| | | | |
|---|---|---|---|
| 4,432,032 A | 2/1984 | Baker et al. | |
| 6,518,739 B2 * | 2/2003 | Wald et al. | 323/351 |
| 7,609,494 B2 * | 10/2009 | Webb | 361/56 |
| 7,817,449 B2 * | 10/2010 | Lee | 363/39 |
| 8,344,657 B2 * | 1/2013 | Zhan et al. | 315/302 |
| 8,456,870 B2 * | 6/2013 | Cho et al. | 363/21.12 |
| 8,508,959 B2 * | 8/2013 | Kwon | 363/21.14 |
| 2007/0091651 A1 * | 4/2007 | Jang | 363/21.01 |
| 2007/0195559 A1 * | 8/2007 | Gong | 363/21.01 |
| 2009/0257255 A1 * | 10/2009 | Zhang | 363/50 |
| 2011/0013430 A1 * | 1/2011 | Lee | 363/44 |

FOREIGN PATENT DOCUMENTS

JP 2001-112254 4/2001

* cited by examiner

*Primary Examiner* — Adolf Berhane
(74) *Attorney, Agent, or Firm* — Stanzione & Kim, LLP

(57) ABSTRACT

A switching mode power supply (SMPS) includes at least one transformer, a switching unit to switch a voltage applied to the at least one transformer, a snubber circuit connected to the switching unit, a first switch to control an on or off operation of the snubber circuit, and a second switch to control an on or off operation of the first switch.

20 Claims, 7 Drawing Sheets

SWITCHING MODE POWER SUPPLY AND METHOD OF CONTROLLING THE SAME

CROSS-REFERENCE TO RELATED APPLICATIONS

This application claims the benefit of priority from Korean Patent Application No. 10-2010-0076634, filed on Aug. 9, 2010, in the Korean Intellectual Property Office, the disclosure of which is incorporated by reference herein in its entirety.

BACKGROUND OF THE INVENTION

1. Field of the Invention

The present general inventive concept relates to a switching mode power supply (SMPS) and a method of controlling the same.

2. Description of the Related Art

As a power supply for supplying power to an electronic product, a switching mode power supply (SMPS) may be used. An SMPS transforms an input alternating-current (AC) voltage and outputs a constant voltage for operating an electronic product. If an electronic product is on standby in a ready mode for a predetermined period of time, the electronic product enters a power saving mode. Currently, restraints on standby power of electronic products are getting strong to globally reduce generation of carbon dioxide and thus a solution for reducing power consumption of a power supply in a power saving mode is required

SUMMARY OF THE INVENTION

The present general inventive concept provides a switching mode power supply (SMPS) capable of reducing standby power and a method of controlling the same.

The present general inventive concept also provides a non-transitory computer-readable recording medium having recorded thereon a computer program to execute the method.

Additional aspects and advantages of the present general inventive concept will be set forth in part in the description which follows and, in part, will be obvious from the description, or may be learned by practice of the general inventive concept.

Features of the present general inventive concept may be realized by a switching mode power supply (SMPS) for an image forming device, the SMPS including at least one transformer, a switching unit to switch a voltage applied to the at least one transformer, a snubber circuit connected to the switching unit, a first switch to control an on or off operation of the snubber circuit, and a second switch to control an on or off operation of the first switch according to whether the image forming device is in a ready mode or a power saving mode.

Features of the present general inventive concept may also be realized by an image forming device including a switching mode power supply (SMPS), the image forming device including the SMPS including at least one transformer and a first switch to control an on or off operation of a snubber circuit connected to a switching unit to switch a voltage applied to the at least one transformer, based on a result of comparing a threshold value to a value of a voltage or a current at one point of a first-side circuit or a second-side circuit of the at least one transformer according to whether the image forming device is in a ready mode or a power saving mode, and an image forming unit being operable by an output voltage of the SMPS and to form an image of print data.

Features of the present general inventive concept may also be realized by a method of controlling a switching mode power supply (SMPS) for an image forming device, the method including controlling a second switch based on a result of comparing a threshold value to a value of a voltage or a current at one point of a first-side circuit or a second-side circuit of at least one transformer included in the SMPS according to whether the image forming device is in a ready mode or a power saving mode, and controlling by the control of the second switch a first switch to control an on or off operation of a snubber circuit connected to a switching unit to switch a voltage applied to the at least one transformer.

Features of the present general inventive concept may also be realized by a non-transitory computer-readable recording medium having recorded thereon a computer program to execute the method of controlling a switching mode power supply (SMPS) for an image forming device.

Features of the present general inventive concept may also be realized by a switching mode power supply (SMPS) including a transformer, a switching unit to control a power output to the transformer to control a power output from the SMPS, a snubber circuit to prevent over-voltage to the switching unit, and at least one switch to activate the snubber circuit when a received one of voltage and current is greater than a threshold voltage or current, respectively, and to deactivate the snubber circuit when the received one of the voltage and current is less then or equal to the threshold voltage or current, respectively.

Features of the present general inventive concept may also be realized by a method of supplying power with a switching mode power supply (SMPS) having a switching unit and a snubber circuit to prevent over-voltage to the switching circuit and at least one switch to control the snubber circuit, the method including controlling an ON/OFF state of the at least one switch based on a magnitude of a received one of voltage and current corresponding to a voltage or current, respectively, to be output from the SMPS, and activating the snubber circuit when the at least one switch is in one of the ON/OFF states, and de-activating the snubber circuit when the at least one switch is in the other of the ON/OFF states.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
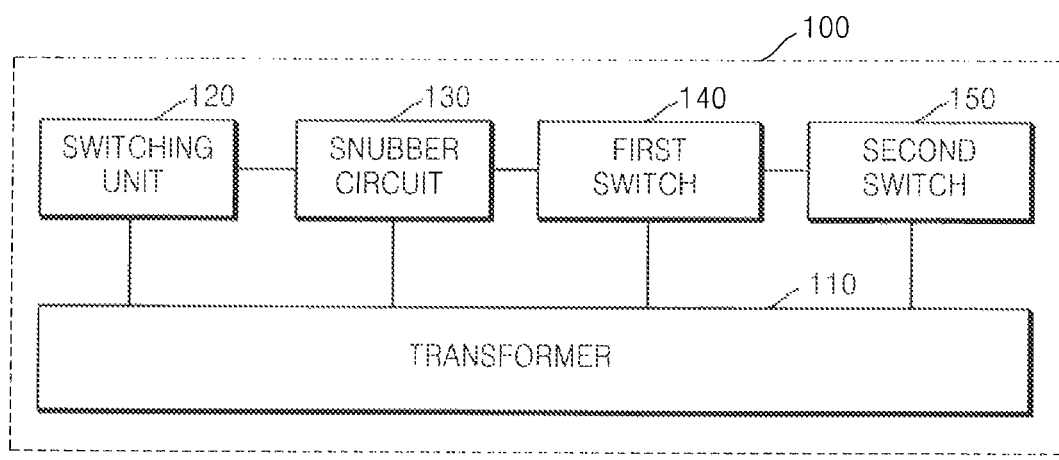
FIG. 1 is a block diagram of a switching mode power supply (SMPS) according to an embodiment of the present general inventive concept.

The present general inventive concept will now be described more fully with reference to the accompanying drawings, in which exemplary embodiments of the present general inventive concept are shown. Like reference numerals refer to the like elements throughout.

FIG. 1 is a block diagram of a switching mode power supply (SMPS) 100 according to an embodiment of the present general inventive concept. Referring to FIG. 1, the SMPS 100 includes a transformer 110, a switching unit 120, a snubber circuit 130, a first switch 140, and a second switch 150.

In FIG. 1, only components related to the current embodiment are illustrated. Accordingly, it will be understood by one of ordinary skill in the art that the SMPS 100 may further include general-use components other than the components illustrated in FIG. 1.

The SMPS 100 illustrated in FIG. 1 may be, but is not limited to, an SMPS for an image forming device. Hereinafter, it is assumed for convenience of explanation that the SMPS 100 is used in an image forming device. However, the present general inventive concept is not limited thereto and it will be understood by one of ordinary skill in the art that the SMPS 100 may be used to supply power to an image scanning device, a multi-function peripheral (MFP), a personal computer (PC), a fax, a television (TV), an electronic product using an SMPS, etc.

The SMPS 100 may control general operation of the image forming device by applying constant and stable direct-current (DC) power or a DC bias voltage to the image forming device. As such, the SMPS 100 transforms an alternating-current (AC) voltage into a first DC voltage, and further transforms the transformed first DC voltage into a second DC voltage having a magnitude required by the image forming device.

In this case, the first DC voltage may be transformed into the second DC voltage by using a non-switching method or a switching method.

The non-switching method may use a resistive voltage divider or a linear voltage divider. The switching method may use a time-ratio control method and, in this case, the time-ratio control method may include a duty cycle control method or a pulse-width modulation method.

As such, the SMPS 100 may transform the first DC voltage into the second DC voltage based on the switching method by using the transformer 110.

The transformer 110 transfers electrical energy from one circuit to another circuit by using an induction operation of a coil. For example, the transformer 110 may transfer electric energy applied to a first-side coil, to a second-side coil. That is, the first DC voltage applied to the first-side coil of the transformer 110 is transferred as the second DC voltage to the second-side coil of the transformer 110.

The switching unit 120 switches a voltage applied to the transformer 110. The switching unit 120 may be, but is not limited to, a metal-oxide-semiconductor field-effect transistor (MOSFET).

For example, the switching unit 120 may be switched in a cycle according to the control of a driving voltage of a switching control unit (not shown), and the voltage switched by the switching unit 120 may be applied to the first-side coil of the transformer 110. In this case, the switching control unit may be, but is not limited to, a pulse-width modulation (PWM) integrated circuit (IC).

The snubber circuit 130 is connected to the switching unit 120. The snubber circuit 130 includes a capacitor and a resistor, and may be connected in parallel to two ends of the first-side coil of the transformer 110 and the switching unit 120.

The snubber circuit 130 protects the switching unit 120 from over-voltage. For example, if the switching unit 120 is an n-channel MOSFET (n-MOSFET), the snubber circuit 130 may prevent application of a peak voltage to the n-MOSFET.

In more detail, for example, when it is assumed that the first switch 140 is a silicon control rectifier (SCR), if the switching unit 120 has a large rating and the switching unit 120 is rapidly turned on or off, a forward current is concentrated on a partial cross section of the SCR and heat is locally generated. As such, the switching unit 120 may be damaged.

In order to prevent damage of the switching unit 120, an increasing ratio of a forward current according to time (e.g., di/dt) may be restricted by inserting an inductor into a circuit. As such, although the switching unit 120 is rapidly turned on or off, a current may not be increased abruptly and thus damage of the switching unit 120 may be prevented.

Also, in order to prevent damage of the switching unit 120, an increasing ratio of a forward voltage according to time (e.g., dv/dt) may be restricted by inserting a resistor and a capacitor into two ends of a circuit. If a large forward voltage is abruptly applied, an SCR having a PNPN structure may be turned on due to a capacitance current on a junction surface although a signal is not applied to a gate terminal of the SCR. Accordingly, an increasing ratio of a forward voltage according to time (e.g., dv/dt) may be restricted by inserting a resistor and a capacitor into two ends of a circuit and thus the above-mentioned problem may be prevented.

In this case, a circuit for restricting an increasing ratio of a voltage according to time (e.g., dv/dt) by inserting a resistor and a capacitor into two ends of the circuit may be referred to as the snubber circuit 130.

As such, if the snubber circuit 130 did not exist, when a MOSFET is turned off, energy remaining in the first-side coil of the transformer 110 may be applied to a drain terminal of the MOSFET as a peak voltage.

If the snubber circuit 130 including a capacitor and a resistor exists, when a MOSFET is turned off, energy remaining in the first-side coil of the transformer 110 is charged in the capacitor of the snubber circuit 130 and the energy charged in the capacitor may be consumed by the resistor.

As such, the snubber circuit 130 may protect the switching unit 120 and may improve electro-magnetic interference (EMI) characteristics. However, since the snubber circuit 130 consumes energy applied to the transformer 110, by using the resistor, standby power of the SMPS 100 may be increased. Furthermore, if a load applied to the SMPS 100 is a light load, the energy transfer efficiency of the transformer 110 is reduced and thus power is wasted.

The first switch 140 controls an on or off operation of the snubber circuit 130. The first switch 140 may be, but is not limited to, an SCR, a MOSFET, a photocoupler, a relay, a transistor, a triode AC switch (TRIAC), etc. and may include all switches capable of transferring a signal between electrically insulated circuits. An on or off operation of the first switch 140 is controlled by the second switch 150.

The second switch 150 controls the on or off operation of the first switch 140 according to whether the image forming device is in a ready mode or a power saving mode.

The ready mode is a mode to await the performance of a functional operation of the image forming device. That is, if a signal is received from outside the image forming device, the image forming device may immediately perform an operation corresponding to the signal. In this case, the signal received from outside the image forming device may be a print command signal, a scan commend signal, etc. according to the function of the image forming device.

Accordingly, if the image forming device is in the ready mode, power is supplied to all units included in the image forming device, e.g., a control unit such as a central processing unit (CPU), and thus all units operate normally.

On the other hand, the power saving mode is a mode in which only some units of the image forming device are activated. For example, if the image forming device is in the power saving mode, only the control unit of the image forming device may operate normally and power may not be supplied to units other than the control unit.

If the image forming device does not perform any operation for a predetermined period of time, the image forming device may enter the power saving mode. If a signal is received from outside the image forming device in the power saving mode, the image forming device is switched to the ready mode. In this case, the signal received from outside the image forming device may be a print command signal, a scan command signal, etc. according to the function of the image forming device.

The second switch 150 may control the on or off operation of the first switch 140 according to whether the image forming device is in the ready mode or the power saving mode. The second switch 150 may be a directional element for passing electric charges only in one direction within a predetermined voltage range, e.g., a diode. However, the second switch 150 is not limited thereto and may include a Zener diode, a Schottky diode, a light emitting diode (LED), a transient voltage suppression (TVS) diode, etc.

For example, the second switch 150 is turned on or off based on a result of comparing a threshold value to a value of a voltage or a current of a first-side circuit or a second-side circuit of the transformer 110, so as to control the on or off operation of the first switch 140. In this case, for example, if the second switch 150 is a diode, the threshold value may be a value according to voltage characteristics of the diode. Otherwise, for example, if the second switch 150 is a Zener diode, it will be understood by one of ordinary skill in the art that the threshold value may be a value of a breakover voltage of the Zener diode.

That is, the second switch 150 compares the threshold value to the value of the voltage or the current at the predetermined point of the first-side circuit or the second-side circuit of the transformer 110, and is turned on or off based on the result of the comparison. The on or off operation of the first switch 140 may be controlled according to the on or off operation of the second switch 150.

As such, the second switch 150 controls the on or off operation of the first switch 140 based on a load according to an operational mode of the image forming device.

In more detail, the load of the image forming device may be a heavy load if the image forming device is in the ready mode, and may be a light load if the image forming device is in the power saving mode. In the SMPS 100, the value of the voltage or the current at the predetermined point of the first-side circuit or the second-side circuit of the transformer 110 may vary according to the load of the image forming device. Accordingly, the second switch 150 may be turned on or off according to the load of the image forming device, and the on or off operation of the first switch 140 may be controlled according to the on or off operation of the second switch 150.

For example, the load of the image forming device may be divided into a heavy load and a light load according to an operational mode. In this case, the image forming device may be in the ready mode if the load of the image forming device is a heavy load, and may be in the power saving mode if the load of the image forming device is a light load.

If the image forming device has a heavy load, the energy transfer efficiency is equal to or greater than about 80% and thus power loss in the snubber circuit 130 is not large. However, if the image forming device has a light load, the energy transfer efficiency is equal to or less than about 50% and thus power loss in the snubber circuit 130 is large.

As such, if the image forming device is in the power saving mode, the second switch 150 controls the first switch 140 to open the snubber circuit 130. Since the size of a current flowing through the SMPS 100 is not large if the image forming device is in the power saving mode, the snubber circuit 130 does not greatly influence electromagnetic interference (EMI) characteristics and does not apply a large amount of stress to the switching unit 120.

Accordingly, the SMPS 100 may not only protect the switching unit 120 and but also reduce standby power of the image forming device by using the first switch 140 and the second switch 150.

For example, when it is assumed that the SMPS 100 is a 70-watt level, if the image forming device is in the power saving mode, power consumption may be reduced by about 10% or more by turning off the snubber circuit 130.

In more detail, for example, when it is assumed that the SMPS 100 has output voltages of 5 volts and 24 volts, if the image forming device is in the power saving mode, in the SMPS 100, a current of about 0.059 A flows through a terminal for outputting the voltage of 5 volts, and a terminal for outputting the voltage of 24 volts is turned off. As such, output power of the SMPS 100 may be 0.3 watt according to the voltage of 5 volts and the current of 0.059 A.

As described above, the SMPS 100 may reduce power consumption by about 10% or more according to whether the snubber circuit 130 operates. In this case, the power consumption of the SMPS 100 may be power input to the SMPS 100.

For example, if the image forming device is in the power saving mode and the snubber circuit 130 is turned on, the power consumption of the SMPS 100 may be about 0.73 watt. As such, the SMPS 100 may receive power of about 0.73 watt and may output power of about 0.3 watt. In this case, the efficiency of the SMPS 100 is about 41%.

However, if the image forming device is in the power saving mode and the snubber circuit 130 is turned off, the power consumption of the SMPS 100 may be about 0.65 watt. As such, the SMPS 100 may receive power of about 0.65 watt and may output power of about 0.3 watt. In this case, the efficiency of the SMPS 100 is about 46%.

As described above, the efficiency of the SMPS 100 may be improved by turning off the snubber circuit 130. That is, since the snubber circuit 130 consumes power of about 0.08 watt if the image forming device is in the power saving mode, power consumed by the snubber circuit 130 may be reduced by turning off the snubber circuit 130.

Figure 2:
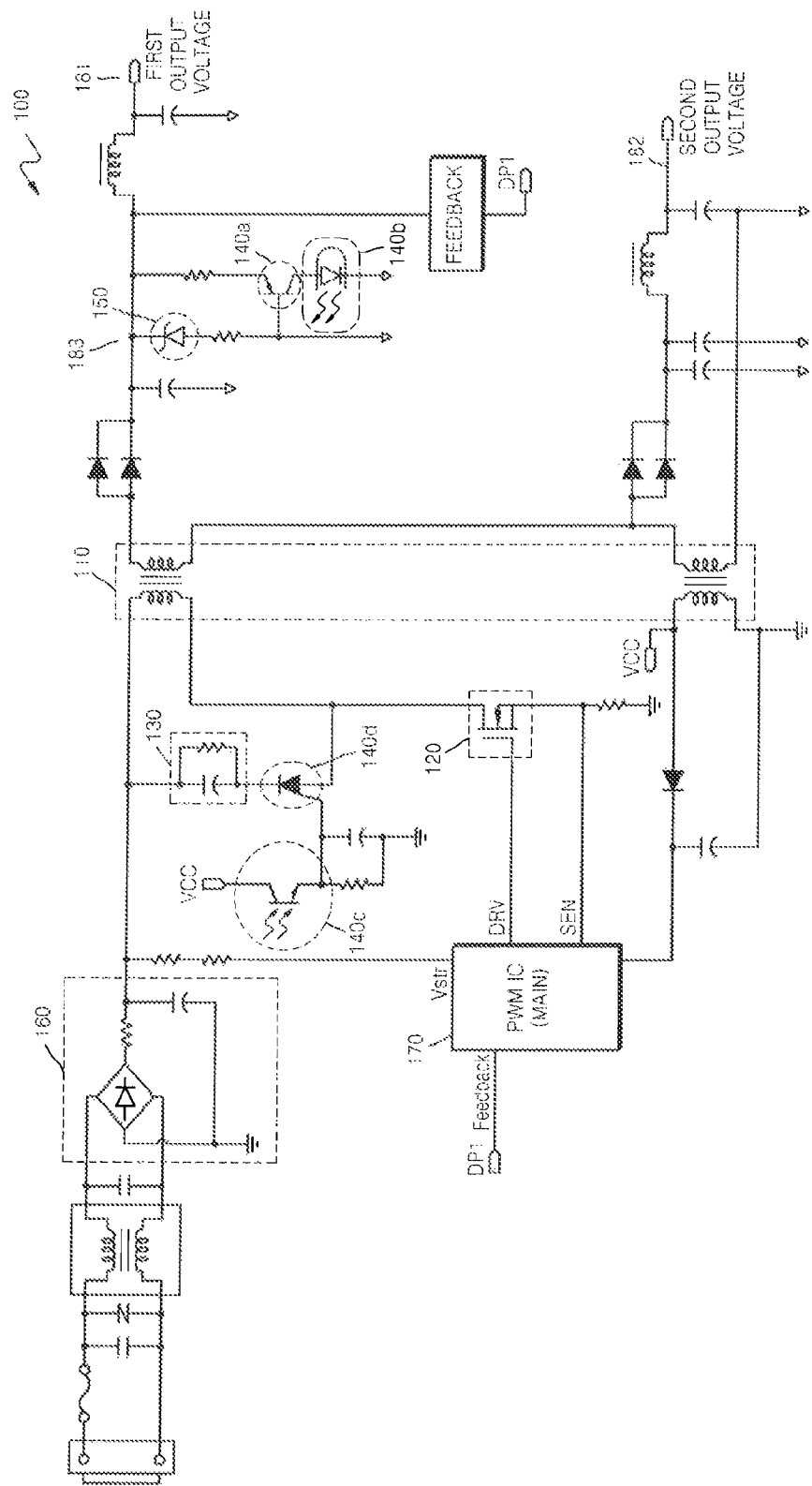
FIG. 2 is a circuit diagram of the SMPS illustrated in FIG. 1, according to an embodiment of the present general inventive concept.

FIG. 2 is a circuit diagram of the SMPS 100 illustrated in FIG. 1, according to an embodiment of the present general inventive concept. The operational principles of the circuit illustrated in FIG. 2 will be understood by one of ordinary skill in the art and thus a detailed description thereof will not be provided here.

Referring to FIG. 2, a rectification unit 160 rectifies an AC voltage. For example, the rectification unit 160 may include a rectification element for rectifying AC power and a smoothing element for smoothing the rectified power. For example, the rectification element may be, but is not limited to, a bridge circuit using a diode, and the smoothing element may be, but is not limited to, a capacitor.

The switching control unit 170 controls the switching unit 120. The switching control unit 170 may be, but is not limited to, a PWM IC. For example, if the switching control unit 170 is a PWM IC, the switching control unit 170 controls the switching unit 120 by using a signal output from a driving terminal.

The switching unit 120 switches a voltage applied to the first-side coil of the transformer 110, by the control of the switching control unit 170. As such, an AC voltage having a predetermined cycle may be applied to the transformer 110.

The transformer 110 transforms the voltage applied to the first-side coil, into at least one DC voltage. The transformer 110 may output a first output voltage 181 and a second output voltage 182.

If the SMPS 100 is used in an image forming device, the first output voltage 181 is used to operate an image forming unit (not shown) of the image forming device and may be, but is not limited to, a DC voltage of about 24 volts, and the second output voltage 182 is used to operate a main system (micom) of the image forming device and may be, but is not limited to, a DC voltage of about 5 volts or about 3.3 volts. The image forming unit may include hardware components to perform electrifying, exposing, developing, transferring, and fixing operations to form an image of print data.

The second switch 150 performs a switching operation according to a voltage at a first point 183 of the second-side circuit of the transformer 110. For example, the second switch 150 may be a Zener diode. If the first output voltage 181 is a DC voltage of 24 volts, a breakover voltage of Zener diode, i.e., a threshold value of the second switch 150, may be 24 volts.

For example, when the image forming device is in the ready mode, if 24 volts is output as the first output voltage 181 of the SMPS 100 and thus the image forming device is switched to the power saving mode, the first output voltage 181 is increased (e.g., to about 26 volts).

Accordingly, if a voltage at a predetermined point of the second-side circuit of the transformer 110 is greater than the first output voltage 181 when the image forming device is in the ready mode, the second switch 150 operates to turn off the snubber circuit 130.

In more detail, the second switch 150 may include a Zener diode to be turned on if the voltage at the first point 183 of the second-side circuit of the transformer 110 is greater than the first output voltage 181 of the transformer 110 which passes the first point 183 from among output voltages of the transformer 110 when the image forming device is in the ready mode. As such, the first switch 140 may turn off the snubber circuit 130.

The first switch 140 includes a transistor 140*a* to be turned off if the second switch 150 is turned on, a photocoupler (140*b* and 140*c*) to be insulated if the transistor 140*a* is turned off, and an SCR 140*d* to be turned off if the photocoupler (140*b* and 140*c*) is insulated.

The transistor 140*a* may be a PNP transistor. In more detail, if the second switch 150 is turned on, a current is applied to a base terminal of the PNP transistor and thus the PNP transistor is turned off. If the PNP transistor is turned, off a light emitting unit 140*b* of the photocoupler does not emit light and thus the light emitting unit 140*b* and a light receiving unit 140*c* of the photocoupler are electrically insulated from each other. Accordingly, since a gate voltage of the SCR 140*d* is not applied, the SCR 140*d* is turned off and the snubber circuit 130 does not operate.

The photocoupler (140*b* and 140*c*) includes the light emitting unit 140*b* and the light receiving unit 140*c*. If the image forming device is in the ready mode and thus the Zener diode, i.e., the second switch 150, is turned off, the transistor 140*a* is turned on the light emitting unit 140*b* emits light, and the light receiving unit 140*c* receives light emitted from the light emitting unit 140*b*. As such, the photocoupler (140*b* and 140*c*) is shorted. Accordingly, the SCR 140*d* is turned on and thus the snubber circuit 130 operates.

As such, since the SMPS 100 turns off the snubber circuit 130 if the image forming device is in the power saving mode, standby power of the image forming device may be reduced.

Figure 3:
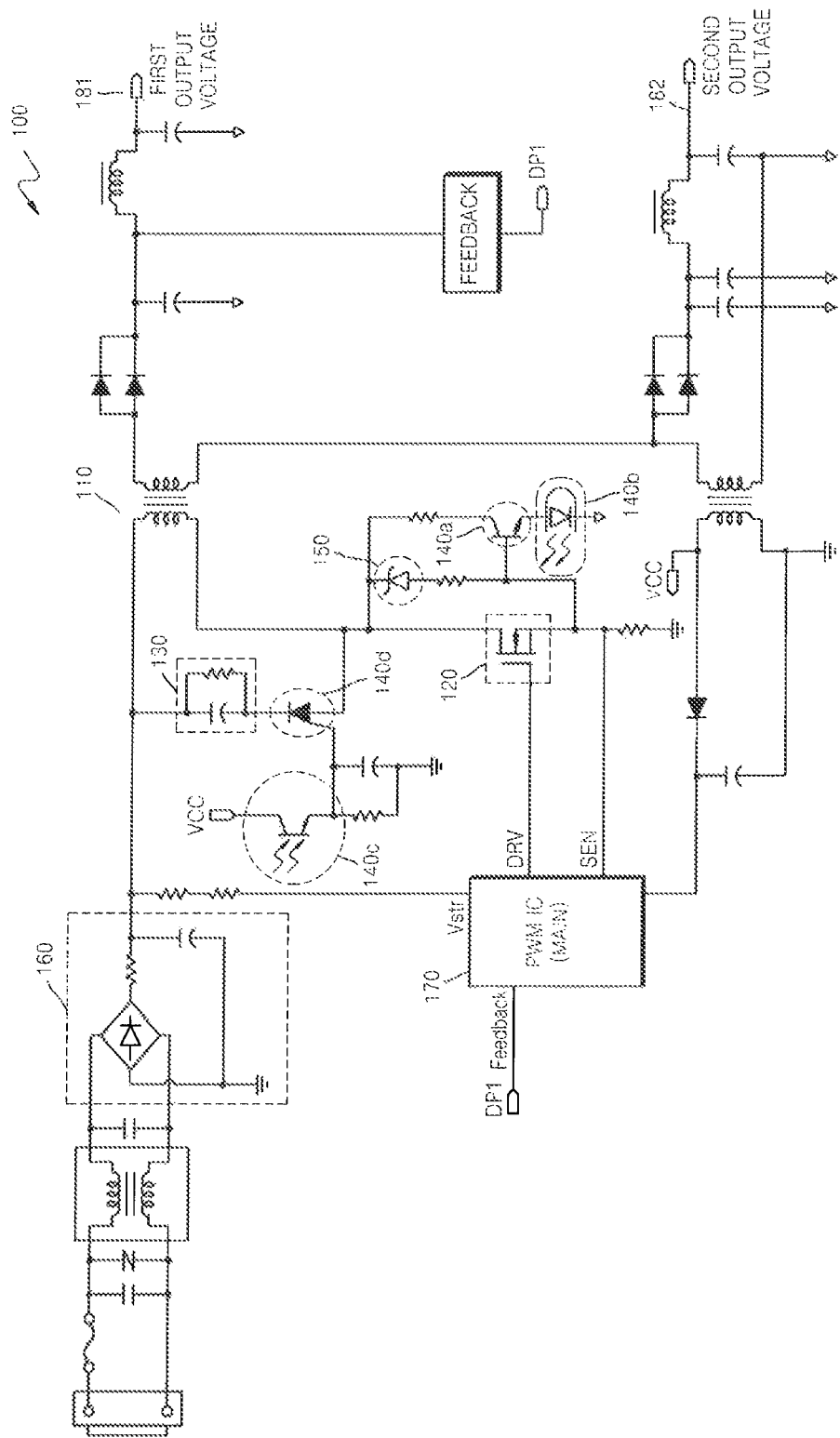
FIG. 3 is a circuit diagram of the SMPS illustrated in FIG. 1, according to another embodiment of the present general inventive concept.

FIG. 3 is a circuit diagram of the SMPS 100 illustrated in FIG. 1, according to another embodiment of the present general inventive concept. The operational principles of the circuit illustrated in FIG. 3 will be understood by one of ordinary skill in the art and thus a detailed description thereof will not be provided here.

Also, the circuit illustrated in FIG. 3 is the same as the circuit illustrated in FIG. 2, except that the second switch 150 performs a switching operation according to a voltage of the first-side circuit of the transformer 110 in FIG. 3 while the second switch 150 performs a switching operation according to a voltage of the second-side circuit of the transformer 110 in FIG. 2, and thus repeated descriptions will not be provided here.

Referring to FIG. 3, the switching unit 120 may be a MOSFET. The MOSFET may be, but is not limited to, an n-MOSFET.

For example, if the second switch 150 is a Zener diode, the Zener diode is connected in parallel to drain and source terminals of the n-MOSFET, i.e., an example of the switching unit 120.

A drain-source voltage of the n-MOSFET when the image forming device is in the power saving mode is less than that when the image forming device is in the ready mode.

As such, the Zener diode is turned off if the drain-source voltage of the n-MOSFET is less than that when the image forming device is in the ready mode. As such, the first switch 140 turns off the snubber circuit 130 if the Zener diode, i.e., the second switch 140, is turned off.

The first switch 140 includes a transistor 140*a* to be turned off if the second switch 150 is turned off, a photocoupler (140*b* and 140*c*) to be insulated if the transistor 140*a* is turned off, and an SCR 140*d* to be turned off if the photocoupler (140*b* and 140*c*) is insulated.

The transistor 140*a* may be an NPN transistor. In more detail, if the second switch 150 is turned off, a current is not applied to a base terminal of the NPN transistor and thus the NPN transistor is turned off. If the NPN transistor is turned off, a light emitting unit 140*b* of the photocoupler does not emit light and thus the light emitting unit 140*b* and a light receiving unit 140*c* of the photocoupler are electrically insulated from each other. Accordingly, since a gate voltage of the SCR 140*d* is not applied, the SCR 140*d* is turned off and the snubber circuit 130 does not operate.

The photocoupler (140*b* and 140*c*) includes the light emitting unit 140*b* and the light receiving unit 140*c*. If the image forming device is in the ready mode and thus the Zener diode, i.e., the second switch 150, is turned on, the transistor 140*a* is turned on, the light emitting unit 140*b* emits light, and the light receiving unit 140*c* receives light emitted from the light emitting unit 140*b*. As such, the photocoupler (140*b* and 140*c*) is shorted. Accordingly, the SCR 140*d* is turned on and thus the snubber circuit 130 operates.

As such, since the SMPS 100 turns off the snubber circuit 130 if the image forming device is in the power saving mode, standby power of the image forming device may be reduced.

Figure 4:
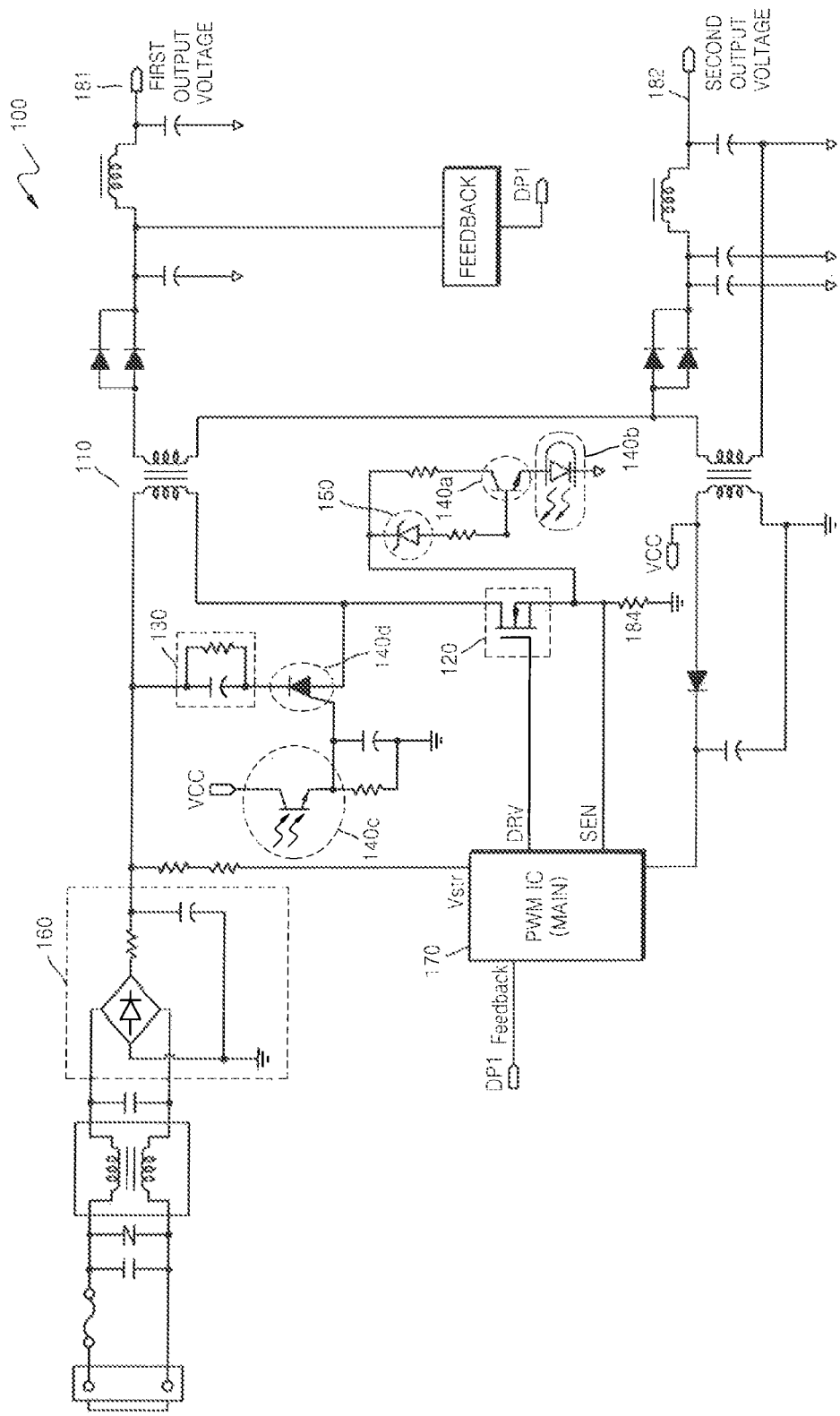
FIG. 4 is a circuit diagram of the SMPS illustrated in FIG. 1, according to another embodiment of the present general inventive concept.

FIG. 4 is a circuit diagram of the SMPS 100 illustrated in FIG. 1, according to another embodiment of the present general inventive concept. The operational principles of the circuit illustrated in FIG. 4 will be understood by one of ordinary skill in the art and thus a detailed description thereof will not be provided here.

Also, the circuit illustrated in FIG. 4 is the same as the circuit illustrated in FIG. 3, except that the second switch 150 performs a switching operation according to a current of the first-side circuit of the transformer 110 in FIG. 4 while the second switch 150 performs a switching operation according to a voltage of the first-side circuit of the transformer 110 in FIG. 3, and thus repeated descriptions will not be provided here.

Referring to FIG. 4, the switching unit 120 may be a MOSFET. The MOSFET may be, but is not limited to, an n-MOSFET.

For example, if the second switch 150 is a Zener diode, the Zener diode is connected to a source terminal of the n-MOSFET, i.e., an example of the switching unit 120.

A current that flows through a resistor 184 connected to the source terminal of the n-MOSFET when the image forming device is in the power saving mode is less than that when the image forming device is in the ready mode.

As such, the Zener diode is turned off if the current that flows through the resistor 184 connected to the source terminal of the n-MOSFET is less than that when the image forming device is in the ready mode. As such, the first switch 140 turns off the snubber circuit 130 if the Zener diode, i.e., the second switch 140, is turned off.

The first switch 140 includes a transistor 140*a* to be turned off if the second switch 150 is turned off, a photocoupler (140*b* and 140*c*) to be insulated if the transistor 140*a* is turned off, and an SCR 140*d* to be turned off if the photocoupler (140*b* and 140*c*) is insulated.

Except for the above description, the circuit illustrated in FIG. 4 operates the same as the circuit illustrated in FIG. 3 and thus a detailed description thereof will not be provided here.

As such, since the SMPS 100 turns off the snubber circuit 130 if the image forming device is in the power saving mode, standby power of the image forming device may be reduced.

Figure 5:
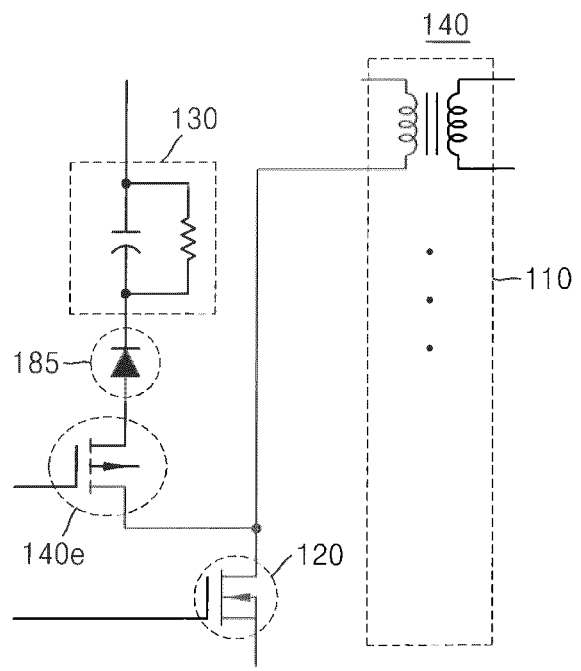
FIG. 5 is a circuit diagram of a first switch illustrated in FIG. 1, according to an embodiment of the present general inventive concept.

FIG. 5 is a circuit diagram of the first switch 140 illustrated in FIG. 1, according to an embodiment of the present general inventive concept. Referring to FIG. 5, the first switch 140 may include a p-channel MOSFET (p-MOSFET) 140*e*. The operational principles of the circuit illustrated in FIG. 5 will be understood by one of ordinary skill in the art in view of the circuits illustrated in FIGS. 2 through 4 and thus a detailed description thereof will not be provided here.

In more detail, like the SCR 140*d* illustrated in FIGS. 2 through 4, the P-channel MOSFET 140*e* may turn off the snubber circuit 130 according to the operation of the second switch 150.

However, unlike the SCR 140*d*, which allows a unidirectional short, the P-channel MOSFET 140*e* may allow a bidirectional short. Accordingly, the SMPS 100 may further include a diode 185 and the first switch 140 may control the on or off operation of the snubber circuit 130 by the control of the second switch 150.

Figure 6:
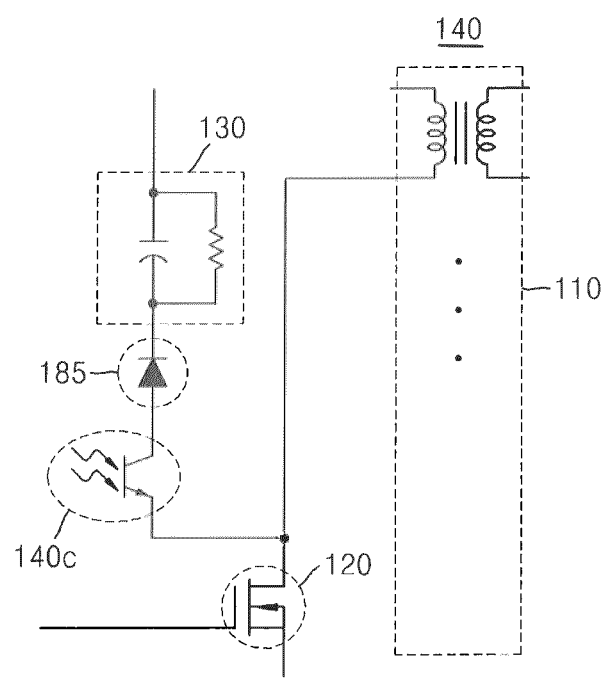
FIG. 6 is a circuit diagram of a first switch illustrated in FIG. 1, according to another embodiment of the present general inventive concept.

FIG. 6 is a circuit diagram of the first switch 140 illustrated in FIG. 1, according to another embodiment of the present general inventive concept. Referring to FIG. 6, the first switch 140 may not include the SCR 140*d* illustrated in FIGS. 2 through 4.

In more detail, the first switch 140 may include a light emitting unit (not shown) and a light receiving unit 140*c* of a photocoupler. As such, the photocoupler may be shorted or insulated by the control of the second switch 150.

The operational principles of the circuit illustrated in FIG. 6 will be understood by one of ordinary skill in the art in view of the circuits illustrated in FIGS. 2 through 5 and thus a detailed description thereof will not be provided here.

Figure 7:
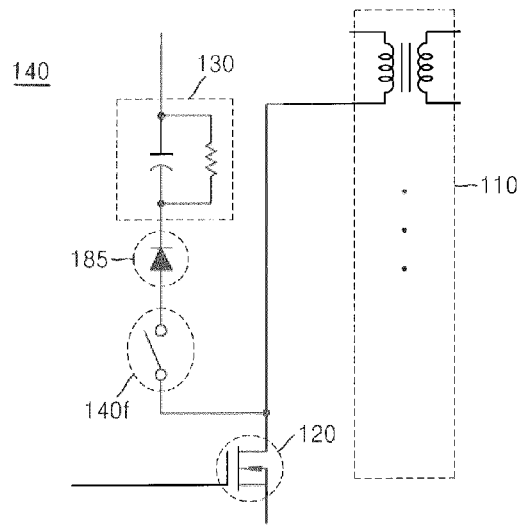
FIG. 7 is a circuit diagram of a first switch illustrated in FIG. 1, according to another embodiment of the present general inventive concept.

FIG. 7 is a circuit diagram of the first switch 140 illustrated in FIG. 1, according to another embodiment of the present general inventive concept. Referring to FIG. 7, the first switch 140 may include a relay 140*f*.

In more detail, the first switch 140 may include a light emitting unit (not shown) and a light receiving unit (not shown) of a photocoupler, and the relay 140*f*. The photocoupler may be shorted or insulated by the control of the second switch 150 and thus the relay 140*f* may be turned on or off.

The operational principles of the circuit illustrated in FIG. 7 will be understood by one of ordinary skill in the art in view of the circuits illustrated in FIGS. 2 through 6 and thus a detailed description thereof will not be provided here.

Figure 8:
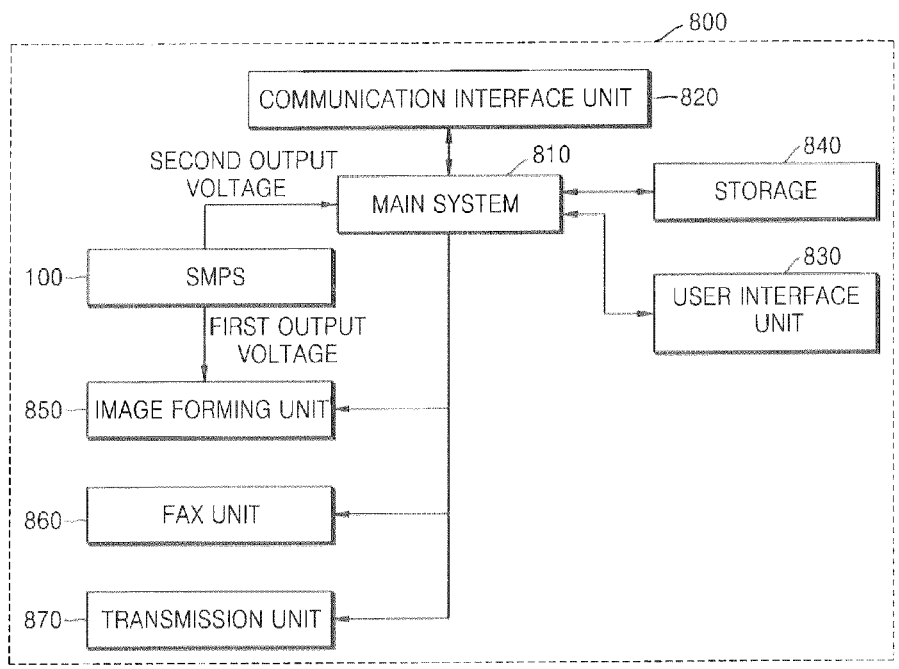
FIG. 8 is a block diagram of an image forming device including an SMPS, according to an embodiment of the present general inventive concept.

FIG. 8 is a block diagram of an image forming device 800 including an SMPS 100, according to an embodiment of the present general inventive concept. Referring to FIG. 8, the image forming device 800 includes the SMPS 100, a main system 810, a communication interface unit 820, a user interface unit 830, a storage 840, an image forming unit 850, a fax unit 860, and a transmission unit 870.

In FIG. 8, only components related to the current embodiment are illustrated. Accordingly, it will be understood by one of ordinary skill in the art that the image forming device 800 may further include general-use components other than the components illustrated in FIG. 8.

Also, the SMPS 100 illustrated in FIG. 8 operates the same as the SMPS 100 illustrated in FIGS. 1 through 7 and thus the descriptions provided above in relation to FIGS. 1 through 7 may also be applied to the SMPS 100 illustrated in FIG. 8.

The SMPS 100 controls a first switch to control an on or off operation of a snubber circuit connected to a switching unit to switch a voltage applied to a transformer of the SMPS 100, based on a result of comparing a threshold value to a value of a voltage or a current at a predetermined point of a first-side circuit or a second-side circuit of the transformer.

The main system 810 may control overall operation of the image forming device 800 and may include a controller to control overall operations of the image forming device 800.

The communication interface unit 820 transmits and receives data to and from an external device. The communication interface unit 820 includes a modulator-demodulator (modem) for, for example, transmitting and receiving faxes, a network module for accessing a network, a universal serial bus (USB) host module to form a data exchange channel with a mobile storage medium, etc. according to the function of the image forming device 800. In this case, the external device is a device connected to the image forming device 800 in a wired or wireless network and includes a fax machine, a computer system, a mobile terminal, a personal digital assistant (PDA), a server, etc.

The user interface unit 830 receives an input signal from a user and displays information to the user. For example, the user interface unit 830 includes input/output (I/O) devices, e.g., a display panel, a mouse, a keyboard, a touch screen, a monitor, and a speaker, included in the image forming device 800.

The storage 840 stores operational data, print data, and scan data of the image forming device 800.

The image forming unit 850 may operate by a first output voltage of the SMPS 100 and forms an image of target print data, the fax unit 860 transmits a fax of target fax data, the transmission unit 870 transmits a target document to the external device such as a server, a mobile storage medium, or a computer system.

Figure 9:
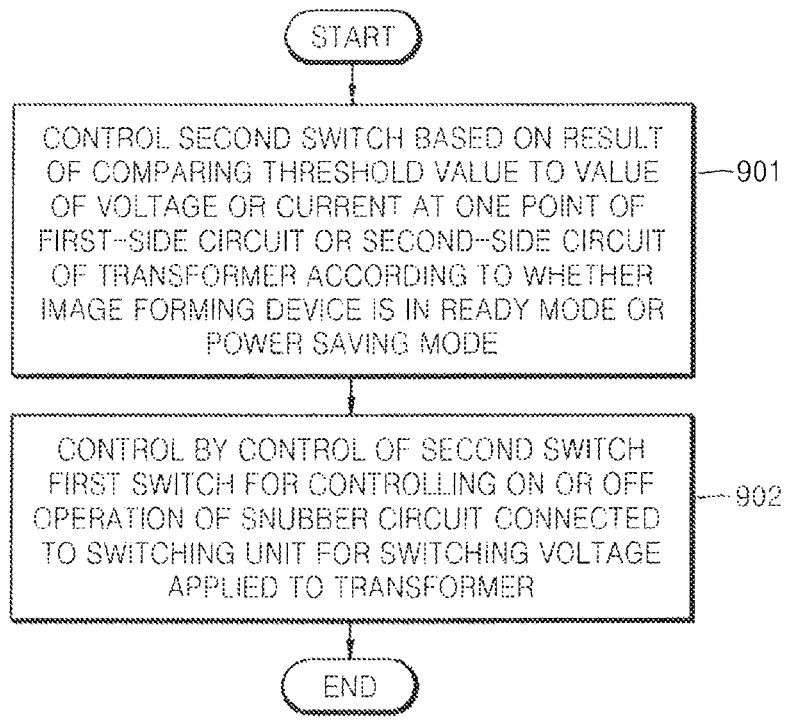
FIG. 9 is a flowchart of a method of controlling the SMPS illustrated in FIG. 1, according to embodiment of the present general inventive concept.

FIG. 9 is a flowchart of a method of controlling the SMPS 100 illustrated in FIG. 1, according to an embodiment of the present general inventive concept. The method illustrated in FIG. 9 includes time-serial operations performed by the SMPS 100 and the image forming device 800 illustrated in FIGS. 1 through 8. Accordingly, the descriptions provided above in relation to the SMPS 100 and the image forming device 800 illustrated in FIG. 1 through FIG. 8 may also be applied to the method illustrated in FIG. 9.

Referring to FIG. 9, in operation 901, the second switch 150 is controlled based on a result of comparing a threshold value to a value of a voltage or a current of a first-side circuit or a second-side circuit of the transformer 110 according to whether the image forming device 800 is in a ready mode or a power saving mode.

In operation 902, the first switch 140 for controlling an on or off operation of the snubber circuit 130 connected to the switching unit 120 for switching a voltage applied to the transformer 110 is controlled by the control of the second switch 150.

Accordingly, since the SMPS 100 does not operate the snubber circuit 130 if the image forming device 800 is in the power saving mode to have a light load, standby power of the image forming device 800 may be reduced.

As described above, according to the present general inventive concept, standby power of an image forming device 800 including an SMPS 100 may be reduced and components included in the SMPS 100 may be protected.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly shown and described with reference to exemplary embodiments thereof, it will be understood by one of ordinary skill in the art that various changes in form and details may be made therein without departing from the spirit and scope of the general inventive concept as defined by the following claims. The exemplary embodiments should be considered in a descriptive sense only and not for purposes of limitation. Therefore, the scope of the general inventive concept is defined not by the detailed description of the general inventive concept but by the following claims, and all differences within the scope will be construed as being included in the present general inventive concept.

What is claimed is:

1. A switching mode power supply (SMPS) for an image forming device, the SMPS comprising:
   at least one transformer;
   a switching unit to switch a voltage applied to the at least one transformer;
   a snubber circuit connected to the switching unit;
   a first switch to control an on or off operation of the snubber circuit; and
   a second switch to control an on or off operation of the first switch according to whether the image forming device is in a ready mode or a power saving mode.

2. The SMPS of claim 1, wherein the second switch is turned on or off based on a result of comparing a threshold value to a value of a voltage or a current at one point of a first-side circuit or a second-side circuit of the at least one transformer, so as to control the on or off operation of the first switch.

3. The SMPS of claim 1, wherein the second switch comprises a Zener diode to be turned on if a voltage at a first point of a second-side circuit of the at least one transformer is greater than an output voltage which passes the first point from among output voltages of the at least one transformer when the image forming device is in the ready mode, and
   wherein the first switch turns off the snubber circuit if the second switch is turned on.

4. The SMPS of claim 3, wherein the first switch comprises:
   a transistor to be turned off if the second switch is turned on;
   a photocoupler to be insulated if the transistor is turned off; and
   a silicon control rectifier (SCR) to be turned off if the photocoupler is insulated.

5. The SMPS of claim 1, wherein the switching unit comprises a metal-oxide-semiconductor field-effect transistor (MOSFET),
   wherein the second switch comprises a Zener diode to be turned off if a drain-source voltage of the MOSFET is less than that when the image forming device is in the ready mode, and
   wherein the first switch turns off the snubber circuit if the second switch is turned off.

6. The SMPS of claim 5, wherein the first switch comprises:
   a transistor to be turned off if the second switch is turned off;
   a photocoupler to be insulated if the transistor is turned off; and
   an SCR to be turned off if the photocoupler is insulated.

7. The SMPS of claim 1, wherein the switching unit comprises a MOSFET,
   wherein the second switch comprises a Zener diode to be turned off if a current that flows through a resistor connected to a source terminal of the MOSFET is less than that when the image forming device is in the ready mode, and wherein the first switch turns off the snubber circuit if the second switch is turned off.

8. The SMPS of claim 7, wherein the first switch comprises:
a transistor to be turned off if the second switch is turned off;
a photocoupler to be insulated if the transistor is turned off; and
an SCR to be turned off if the photocoupler is insulated.

9. The SMPS of claim 1, wherein the first switch comprises at least one of an SCR, a MOSFET, a photocoupler, a relay, a transistor, and a triode alternating-current (AC) switch (TRIAC).

10. The SMPS of claim 1, wherein the second switch is a directional element for passing electric charges in one direction within a predetermined voltage range.

11. An image forming device comprising a switching mode power supply (SMPS), the image forming device comprising:
the SMPS comprising at least one transformer and a first switch to control an on or off operation of a snubber circuit connected to a switching unit to switch a voltage applied to the at least one transformer, based on a result of comparing a threshold value to a value of a voltage or a current at one point of a first-side circuit or a second-side circuit of the at least one transformer according to whether the image forming device is in a ready mode or a power saving mode; and
an image forming unit being operable by an output voltage of the SMPS to form an image of print data.

12. The image forming device of claim 11, wherein the SMPS further comprises a Zener diode to be turned on if a voltage at a first point of the second-side circuit of the at least one transformer is greater than an output voltage of the at least one transformer which passes the first point from among output voltages of the at least one transformer when the image forming device is in the ready mode, and
wherein the first switch turns off the snubber circuit if the Zener diode is turned on.

13. The image forming device of claim 11, wherein the switching unit comprises a metal-oxide-semiconductor field-effect transistor (MOSFET) and the SMPS further comprises:
a Zener diode to be turned off if a drain-source voltage of the MOSFET is less than that when the image forming device is in the ready mode, and
wherein the first switch turns off the snubber circuit if the Zener diode is turned off.

14. The image forming device of claim 11, wherein the switching unit comprises a metal-oxide-semiconductor field-effect transistor (MOSFET) and the SMPS further comprises:
a Zener diode to be turned off if a current that flows through a resistor connected to a source terminal of the MOSFET is less than that when the image forming device is in the ready mode, and
wherein the first switch turns off the snubber circuit if the Zener diode is turned off.

15. A method of controlling a switching mode power supply (SMPS) for an image forming device, the SMPS comprising at least one of transformer, the method comprising:
controlling a second switch based on a result of comparing a threshold value to a value of a voltage or a current at one point of a first-side circuit or a second-side circuit of the at least one transformer according to whether the image forming device is in a ready mode or a power saving mode; and
controlling by the control of the second switch a first switch to control an on or off operation of a snubber circuit connected to a switching unit to switch a voltage applied to the at least one transformer.

16. The method of claim 15, wherein the first switch comprises at least one of a silicon control rectifier (SCR), a metal-oxide-semiconductor field-effect transistor (MOSFET), a photocoupler, a relay, a transistor, and a triode alternating-current (AC) switch (TRIAC).

17. The method of claim 15, wherein the second switch is a directional element for passing electric charges in one direction within a predetermined voltage range.

18. A non-transitory computer-readable recording medium having recorded thereon a computer program for executing a method to control an image forming device, the method comprising:
controlling a second switch based on a result of comparing a threshold value to a value of a voltage or a current at one point of a first-side circuit or a second-side circuit of at least one transformer according to whether the image forming device is in a ready mode or a power saving mode; and
controlling by the control of the second switch a first switch to control an on or off operation of a snubber circuit connected to a switching unit to switch a voltage applied to the at least one transformer.

19. A switching mode power supply (SMPS), comprising:
a transformer;
a switching unit to control a power output to the transformer to control a power output from the SMPS;
a snubber circuit to prevent over-voltage to the switching unit; and
at least one switch to activate the snubber circuit, according to whether an image device is in a ready mode or a power saving mode, when a received one of voltage and current is greater than a threshold voltage or current, respectively, and to deactivate the snubber circuit when the received one of the voltage and current is less than or equal to the threshold voltage or current, respectively.

20. A method of supplying power with a switching mode power supply (SMPS) having a switching unit and a snubber circuit to prevent over-voltage to the switching circuit and at least one switch to control the snubber circuit, the method comprising:
controlling an ON/OFF state of the at least one switch based on a magnitude of a received one of voltage and current corresponding to a voltage or current, respectively, to be output from the SMPS; and
activating the snubber circuit, according to whether an image forming device is in a ready mode or a power saving mode, when the at least one switch is in one of the ON/OFF states, and de-activating the snubber circuit when the at least one switch is in the other of the ON/OFF states.

* * * * *